Dec. 24, 1963 R. C. LUNN ETAL 3,115,047
SYNCHRONIZED MULTIPLE SPEED POWER TRANSMISSION MECHANISM
Filed Aug. 8, 1960 4 Sheets-Sheet 2

Fig. 2

INVENTORS.
FRANK L. THEYLEG
BY ROYSTON C. LUNN
ATTORNEYS.

INVENTORS.
FRANK L. THEYLEG
BY ROYSTON C. LUNN
ATTORNEYS.

Dec. 24, 1963 R. C. LUNN ETAL 3,115,047
SYNCHRONIZED MULTIPLE SPEED POWER TRANSMISSION MECHANISM
Filed Aug. 8, 1960 4 Sheets-Sheet 4

INVENTORS.
FRANK L. THEYLEG
BY ROYSTON C. LUNN
ATTORNEYS.

United States Patent Office 3,115,047
Patented Dec. 24, 1963

3,115,047
SYNCHRONIZED MULTIPLE SPEED POWER
TRANSMISSION MECHANISM
Royston C. Lunn, Ann Arbor, and Frank L. Theyleg,
Detroit, Mich., assignors to Ford Motor Company,
Dearborn, Mich., a corporation of Michigan
Filed Aug. 8, 1960, Ser. No. 48,077
13 Claims. (Cl. 74—360)

Our invention relates to power transmitting mechanisms, and more particularly to a multiple speed right angle drive capable of transmitting driving torque from a driving shaft to a transversely disposed driven shaft.

According to a principal feature of our invention, we have provided a compact, multiple speed gear arrangement that is adapted to transmit driving torque from an engine to a power output shaft wherein the axis of the power output shaft is situated in directly adjacent and transverse relationship with respect to the axis of the engine crank shaft. Such an arrangement finds particular utility in front wheel drive motor vehicles with forwardly mounted engines and in vehicles having a rearwardly mounted engine and rear traction wheels.

It is possible to utilize our invention in a power train wherein the engine is disposed in a fore and aft position and wherein space requirements make is necessary to locate the driving axle at a station intermediate the engine and the torque transmitting gear elements of the mechanism.

We have accomplished such an arrangement by utilizing concentrically disposed power input and power output shafts, the latter being drivably coupled to a bevel drive pinion that forms a part of a differential mechanism for the axle shafts of the traction wheels.

The gear arrangement comprises synchronized gear elements arranged concentrically with respect to the power input and power output shafts, said gear elements cooperating with synchronized gear elements that are concentrically located about the axis of a countershaft.

The provision of a power transmitting mechanism of the type above set forth being a principal object of our invention, it is a further object of our invention to provide a right angle drive having multiple forward driving speed ratios wherein provision is made for accomplishing a speed ratio shift with a maximum degree of smoothness.

It is a further object of our invention to provide a right angle drive of the type above set forth wherein provision is made for obtaining a plurality of forward driving speed ratios and a reverse driving speed ratio, the torque transmitting path established during operation in the lowest forward driving speed ratio including a gear element that is common to the torque transmitting path established during operation in the reverse driving speed ratio. This common gear element is rotatably mounted about the aforementioned countershaft, and it may be shifted in either axial direction to selectively engage either a gear element of the low speed torque delivery path or a reverse idler.

Another feature of our invention resides in the strategic arrangement of the torque transmitting gear elements of the mechanism so that during operation in one forward driving speed ratio, the gear elements associated with the other torque delivery paths will not be overspeeded at an excessive rate. In a preferred embodiment of our invention, we have provided four forward driving speed ratios, each speed ratio being associated with a separate power delivery path. Each power delivery path is comprised of a first gear element mounted for rotation about the axis of the power input and power output shafts, and a second element mounted for rotation about the axis of a countershaft. When the mechanism is operated in any given speed ratio, the gear elements that are utilized for the other speed ratios assume a neutral condition, and they are driven by the torque delivery portions of the power delivery path. If the idling speeds of these gear elements are allowed to become excessive, premature bearing failure and excessive gear noise will result. It is therefore an object of our invention to overcome the design problems that are associated with overspeeding of the idling gears during forward drive.

It is a further object of our invention to provide a fully synchronized right angle drive having four forward driving speed ratios and a single reverse driving speed ratio, the torque delivery path between the power input shaft and the power output shaft including cooperating gear elements located about spaced parallel axes. A separate synchronizer means is provided for controlling the motion of the gear elements associated with each axis.

It is a further object of our invention to provide a right angle drive of the type above described and which is further characterized by its reduced longitudinal and transverse dimensions.

It is a further object of our invention to provide a right angle drive of the type above described wherein shift rails are provided for controlling the motion of the individual gear elements of the mechanism, and wherein provision is made for inhibiting the action of two of the rails while a third rail is shifted to an operative position. This inhibiting action is provided by an improved shift rail interlock mechanism. The interlock mechanism is an additional feature of our improved transmission structure.

For the purpose of more particularly describing our invention, reference will be made to the accompanying drawings, wherein.

Figure 1:
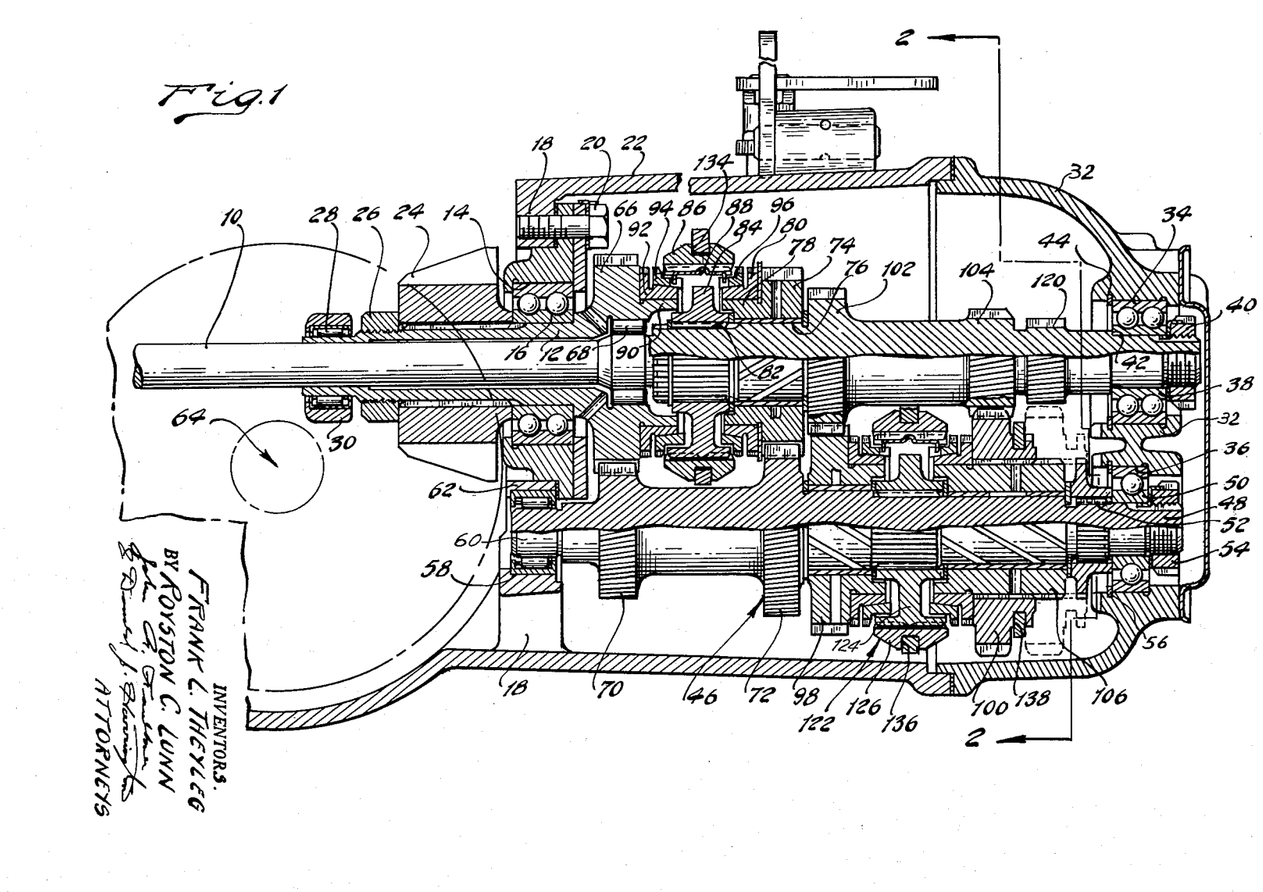
FIGURE 1 is a longitudinal cross sectional view taken along a plane that contains the axis of the power input and power output shaft.

Referring first to FIGURE 1, numeral 10 designates a power input shaft that may be drivably connected to an engine crank shaft. Numeral 12 designates a power output sleeve shaft concentrically disposed with respect to the power input shaft 10. Shaft 12 is journaled within a bearing support 14 by a suitable bearing 16. Bearing support 14 is bolted to a wall 18 by suitable bolts 20, the wall 18 forming a part of a cast transmission housing 22.

A power output bevel pinion 24 is drivably connected to power output shaft 12, a suitable spline connection being provided for this purpose. A retainer nut 26 is threadably received on shaft 12 for the purpose of maintaining bevel pinion 24 in adjacent clamping engagement with the bearing 16. The extended end of shaft 12 can be piloted within a pilot bearing 28, the latter being supported by a relatively stationary bearing support 30 which is connected to housing 22.

The right hand end of the housing 22, as viewed in FIGURE 1, is covered by a housing portion 32 and it is formed with a pair of bearing openings 34 and 36. The right hand end of power input shaft 10 is rotatably journaled by means of a bearing 38 positioned within bearing opening 34. A locking nut 40 is threadably received over the right hand end of shaft 10, as viewed in FIGURE 1, and it engages the inner race for the bearing 38 and urges the same against a shoulder 42 formed on the extreme right hand end of shaft 10. The outer race of bearing 38 is held in place within bearing opening 34 by means of a snap ring 44.

The housing portion 32 is formed with an overlapping lip portion which engages a cooperating recess in the right hand end of housing 22. The housing portion 32 and the housing 22 can be secured together by suitable bolts in a conventional fashion.

A countershaft is generally identified by reference character 46, and it includes a terminal portion 48 that is rotatably journaled within bearing opening 36 by means of a bearing 50. A clutch element 52 is received over terminal portion 48 and it is positioned against a cooperating shoulder on the countershaft 46. A suitable thrust washer is disposed between clutch element 52 and the cooperating shoulder. A locking nut 54 is threadably received over terminal portion 48 and it maintains the inner race for bearing 50 in clamping engagement with respect to the clutch element 52. The outer race for bearing 50 is positioned against a cooperating shoulder on the housing portion 32 by means of a conventional snap ring 56.

The left hand end of countershaft 46, as viewed in FIGURE 1, includes another terminal portion of reduced diameter, and it is received within bearing 62 which in turn is positioned within bearing opening 58.

The bevel pinion 24 is adapted to drivably engage the ring gear of the differential gear mechanism for an axle shaft having a center line that is perpendicularly disposed with respect to the axis of the power input shaft 10. In FIGURE 1, the axis of the axle shaft is identified by reference character 64.

A power output gear 66 is situated on the inward side of wall 18 within the housing 22, and it may be integrally joined to power output shaft 12. The power input shaft 10 can be journaled within the hub of gear 66 by a suitable roller bearing 68, the bearing 68 and the bearing 38 providing end support for the shaft 10.

Gear 66 is in continuous driving engagement with a gear 70 formed on the countershaft 46. The gear 70 and another gear 72 on the countershaft 46 form a so-called cluster gear assembly, the latter gear being in continuous driving engagement with a gear 74 rotatably journaled on power input shaft 10 as indicated. A suitable bushing 76 is disposed about a cooperating bearing portion of shaft 10 for the purpose of rotatably supporting gear 74. A shoulder 78 is formed on gear 74 and it rotatably carries a synchronizer clutch element 80.

Shaft 10 is splined at an intermediate section, as shown at 82, and a synchronizer clutch hub member 84 is splined to portion 82 as indicated. The outer periphery of hub 84 is externally splined, and it carries a sliding clutch element 86. The periphery of hub 84 and the interior of element 86 have cooperating splines to accommodate an axial relative sliding motion therebetween.

The hub 84 is formed with peripherally spaced slots within which are situated thrust bars 88 that are spring urged in a radially outward direction. A detent projection on thrust bars 88 is adapted to cooperate with a corresponding detent recess formed in the interior of sleeve element 86.

By preference, there are three such thrust bars 88 associated with hub 84 and sleeve element 86.

Gear 66 is also formed with a projection 90 which supports a synchronizer clutch element 92. The element 92 and the aforementioned element 80 are formed with cone clutch surfaces which are frictionally engaged by cooperating cone surfaces formed on synchronizer blocker rings 94 and 96 respectively. The blocker ring 94 and the element 92 are formed with external synchronizer clutch teeth which may be engaged by cooperating internal clutch teeth formed on the sleeve element 86. In a similar fashion, synchronizer blocker ring 96 and clutch element 80 are formed with external synchronizer clutch teeth that cooperate with internal teeth formed on sleeve element 86 when the latter is moved in a right hand direction as viewed in FIGURE 1.

When the sleeve element 86 is urged in this fashion in a right hand direction, the blocker element 88 exerts a pressure on blocker ring 96 thereby causing a frictional driving engagement of the cooperating cone clutch surfaces of the blocker ring 96 on the clutch element 80. If the shaft 10 is rotating at a speed which is different than the speed of rotation of gear element 74, the clutching action of the blocker ring 96 will tend to cause the gear element 74 to rotate in synchronism or unison with respect to shaft 10.

In a similar fashion when the synchronizer sleeve 86 is urged in a left hand direction as viewed in FIGURE 1, the thrust bars 88 engage the blocker ring 94 thereby causing clutching engagement between the cooperating cone surfaces of synchronizer clutch element 92 and blocker ring 94. This establishes synchronism between the speeds of rotation of shaft 10 and gear 66.

The countershaft 46 also includes a portion of reduced diameter on which is journaled a gear 98 and a gear 100. Gear 98 continuously engages a gear 102 formed on an intermediate portion of shaft 10, and gear 100 similarly is in continuous meshing engagement with a gear 104 formed on shaft 10. The gears 104, 102, 74, and 66 are formed with progressively increasing pitch diameters as indicated. In a similar fashion the gears 70, 72, 98, and 100 that are associated with the countershaft 46 are formed with progressively increasing pitch diameters.

Gear 100 is slidably splined to an adaptor 106 that is journaled on the shaft 10, said gear 100 being formed with internal splines which cooperate with external splines formed on adaptor 106.

Figure 3:
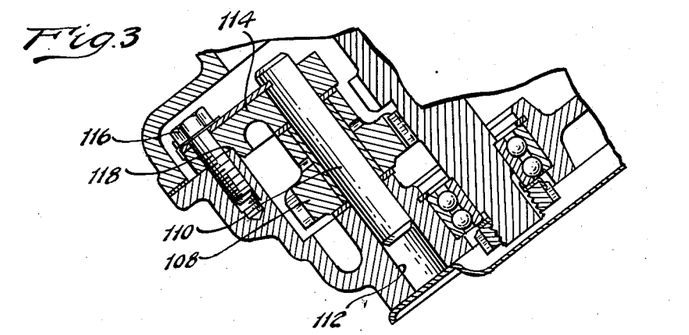
FIGURE 3 is a cross sectional, subassembly view of a portion of the mechanism of FIGURE 1. This figure shows a reverse idler pinion and is taken along a plane that is out of phase with respect to the plane of FIGURE 1.

Referring next to FIGURE 3, a reverse idler gear is shown at 108 and it is journaled on a stationary shaft 110, said shaft 110 being received within an opening 112 in the transmission casing portion 32. The shaft 110 is also supported by and received within a supporting member 114 that is bolted by means of a bolt 116 to a shoulder 118 that is formed on housing portion 32.

Gear 108 is mounted out of the plane of the section of FIGURE 1, and it is in continuous engagement with a reverse drive pinion 120 formed on shaft 110.

Gear 100 is shiftable in an axial direction with respect to the axis of countershaft 46, and when it is shifted in a right hand direction as viewed in FIGURE 1, it engages external spline teeth formed on clutch element 52 thereby locking gear 100 to countershaft 46. Also, when it is so shifted gear 100 drivably engages gear 108 so that a reverse torque delivery path is established between shaft 10 and countershaft 46, said path being defined by pinion 120, gear 108, and gear 100.

A second synchronizer assembly 122 is provided for countershaft 46, and it includes a hub portion 124 splined to countershaft 46. The synchronizer assembly 122 is substantially identical in operation to the synchronizer assembly described with reference to the gears 66 and 74.

Synchronizer assembly 122 includes a synchronizer clutch sleeve 126 that can be shifted in a right hand direction as viewed in FIGURE 1 to establish a driving connection between countershaft 46 and gear 100. When the sleeve 126 is shifted in a left hand direction as viewed in FIGURE 1, a driving connection is provided between countershaft 46 and the gear 98. Synchronizer clutch and blocker elements are provided for synchronizing the motion of countershaft 46 with respect to gears 100 and 98 as they are respectively clutched to the countershaft 46. A smooth shift is thereby accomplished.

During operation, the mechanism can be conditioned for operation in any of four forward driving speed ratios. To establish the lowest speed ratio, synchronizer sleeve 126 is shifted in a right hand direction and gear 100 is thereby clutched to countershaft 46. The torque delivery path is therefore comprised of power input shaft 10, gear 104, gear 100, countershaft 46, gear 70, gear 66, and power output shaft 12, the latter being connected to the bevel pinion 24 as previously explained.

To condition the mechanism for operation in the second speed ratio, synchronizer clutch sleeve 126 is shifted in a left hand direction thereby releasing gear 100 from countershaft 46 and clutching gear 98 to countershaft 46. The torque delivery path is therefore comprised of power input shaft 10, gears 102 and 98, countershaft 46, gears 70 and 66, and power output shaft 12.

To condition the mechanism for operation in the third speed ratio, clutch sleeve 126 is shifted to the neutral position shown in FIGURE 1 thereby releasing gear 98 from countershaft 46, and sleeve 86 is shifted in a right hand direction into clutching engagement with element 80 thereby locking gear 74 to shaft 10. The torque delivery path is therefore comprised of shaft 10, gears 74 and 72, countershaft 46, gears 70 and 66, and power output shaft 12.

To establish a high speed or fourth forward driving speed ratio, sleeve 86 is shifted in a left hand direction as viewed in FIGURE 1, thereby clutching gear 66 directly to shaft 10. This establishes a one-to-one driving ratio between shaft 10 and power output shaft 12, the torque delivery path being defined by the shaft 10, the synchronizer assembly, and power output shaft 12. The magnitudes of the speed ratios established by the various gear elements progressively increase as a shift sequence is made from the first speed ratio to the fourth speed ratio. During operation in the fourth speed ratio, the cluster gear assembly comprised of gears 70 and 72 is continuously rotated by reason of the fact that gear 66 continuously engages gear 70. This rotation does not, however, cause excessive speeds of rotation of the idling gear elements of the mechanism. This is due in part to the fact that gears 98 and 100 are disconnected from countershaft 46 by the associated synchronizer assembly 122.

Reverse drive can be accomplished by shifting gear 100 in a right hand direction as viewed in FIGURE 1. This establishes a driving connection between shaft 10 and countershaft 46, and the direction of rotation of countershaft 46 will be in the same direction as the direction of rotation of shaft 10. It therefore follows that the direction of rotation of shaft 12 will be opposite to the direction of rotation of shaft 10. The gear element 100 forms a portion of the torque delivery path during reverse drive, and it also forms a portion of the torque delivery path during operation in the lowest forward driving speed ratio.

Figure 6:
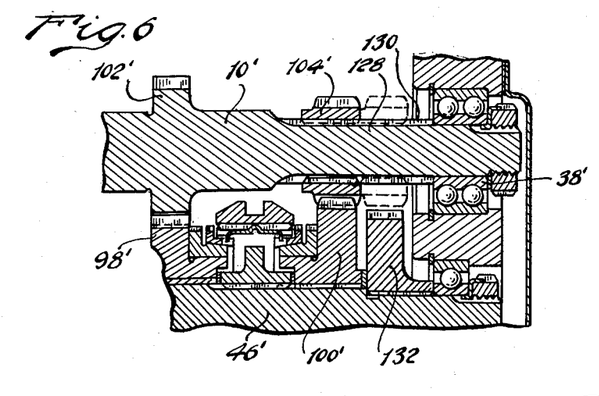
FIGURE 6 is a modification of our invention showing an alternate method for obtaining low speed forward drive and reverse drive.

Referring next to FIGURE 6, I have shown an alternate construction whereby the reverse gear and the low speed gear associated with the countershaft 46 remain stationary. The portions of the mechanism of FIGURE 6 which correspond to the above-described structure of FIGURE 1, have been identified by the same reference characters, although these characters have been shown with a primed superscript notation.

The structure of FIGURE 6 includes a power input or mainshaft 10' having a reduced diameter part 128 with external splines 130. A low speed gear 104' is slidably splined to the part 128, and when it assumes the position shown in FIGURE 6, it is in continuous meshing engagement with gear 100'. When it is so positioned it forms a portion of the low speed torque delivery path. Gear 104' can however be shifted in the right hand direction as viewed in FIGURE 6 so that it is disengaged from gear 100' and engages a reverse idler pinion not shown.

The reverse idler pinion engages in turn gear 132, the latter being positively splined to countershaft 46'.

Figure 2:
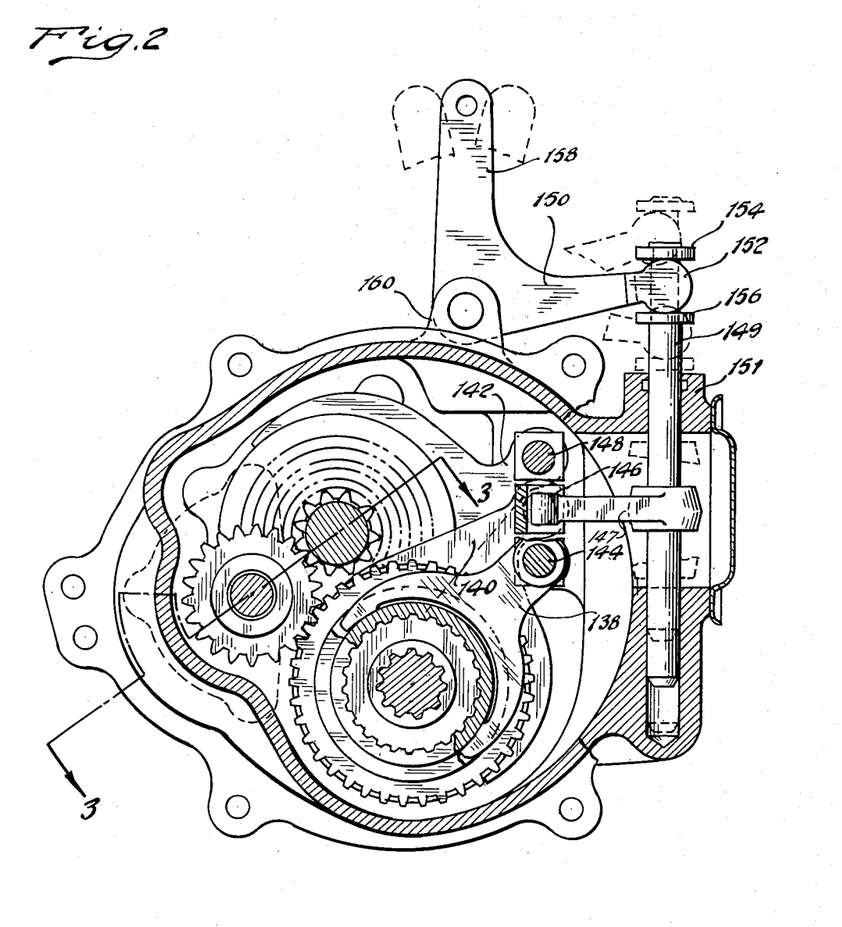
FIGURE 2 is a transverse cross sectional view of the power transmission mechanism of FIGURE 1, and is taken along section line 2—2 of FIGURE 1.

The sleeves 88, 126, and the gear 100, as viewed in FIGURE 1, are formed with annular grooves that are respectively identified by reference characters 134, 136, and 138. A separate shifter fork is received within each of these grooves in order to effect an axial shifting movement to accomplish the above-described shift sequences. The shifter fork associated with reverse gear 100 is shown in FIGURE 2 at 138, and the shifter forks associated with the sleeves 126 and 86 are shown at 140 and 142, respectively. Each of these forks 138, 140, and 142 is formed with a pair of spaced shifting fingers received within the annular groove for the associated gear element. They are supported by shift rails respectively identified in FIGURE 2 by reference characters 144, 146, and 148. The shift rails 144, 146, and 148 are situated in an axial direction with respect to the axes of the shaft 10 and the countershaft 46, and they are supported by means of suitable supporting bosses that form a part of the transmission housing.

Figure 4:
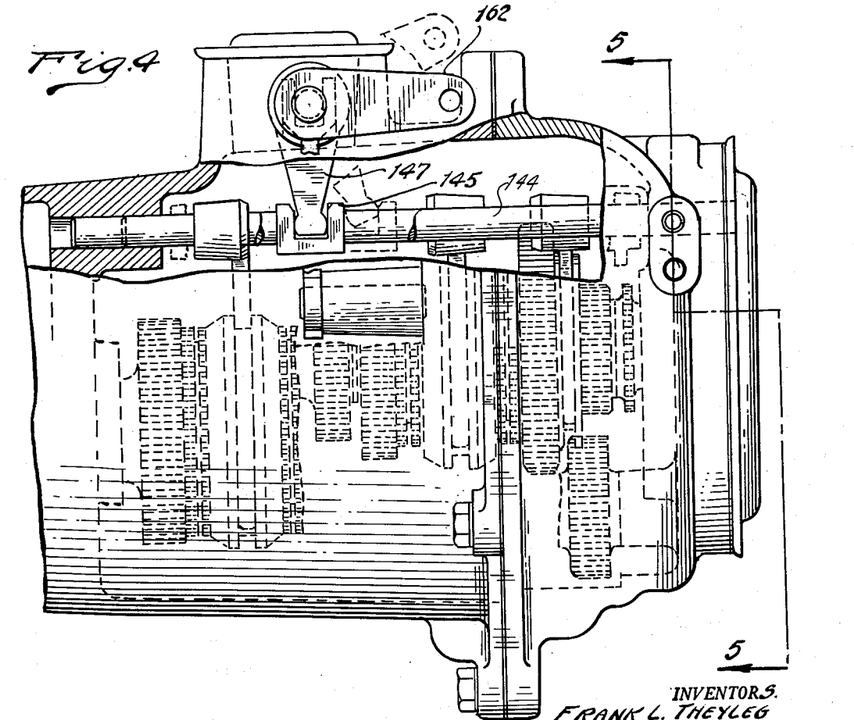
FIGURE 4 is a plan view of the transmission mechanism of FIGURES 1 and 2.

As best seen in FIGURE 4, the shafts 144, 146, and 148 carry collars, one of which is illustrated at 145, said collars being secured in a fixed fashion to their respective shafts. A shifter finger 147 is adapted to be received within any one of the collars for the shafts 144, 146, and 148 as indicated in FIGURE 4, said shifter finger being mounted on a shaft 149 that is best seen in FIGURE 2.

Shaft 149 is rotatably journaled within a boss 151 mounted on the exterior of the transmission housing, and it is adapted to oscillate in an axial direction as well as rotate about its own axis. Oscillation of the shaft 149 is accomplished by means of a shift lever 150 in the form of a bell crank wherein one arm 152 extends within spaced bosses 154 and 156. The lever 150 also includes an arm 158 which can be rotated in either a clockwise direction or a counterclockwise direction as viewed in FIGURE 2 so that the arm 152 will cause a reciprocating motion of the shaft 149. The lever 150 is pivoted on a boss 160 on the exterior of the transmission housing.

As best viewed in FIGURE 4, the shaft 149 also has secured thereto a shift lever 162 which can be rotated in a plane which forms a right angle with respect to the plane of rotation of lever 150. When lever 162 is rotated in this fashion, shaft 149 rotates about its own axis. In doing so, lever 149 will cause the finger 147 to rotate in unison therewith. If the lever 150 is rotated in a clockwise direction to one extreme position, finger 147 will engage the collar 145 associated with the shift rail 144, and when the lever 162 is then rotated in its plane of rotation, the rail 144 will be oscillated in a direction parallel to the direction of the axis of shaft 10 thereby causing the reverse gear 100 to shift in either one direction or the other. The gear 100 can be shifted from the position shown in FIGURE 1 to the reverse drive position by appropriately rotating the lever 162. It will be appreciated that the shifting forks 138, 140, and 142 are secured in a fixed fashion to their respective shift rails so that they are shifted when the shift lever 162 is actuated in this fashion.

If the lever 150 is moved to the position shown in FIGURE 2, the shift finger 147 will be engageable with the collar associated with shift rail 146, and when the lever 162 is subsequently actuated, the synchronizer clutch sleeve 126 will be rotated in either a forward or an aft direction depending upon the direction of rotation of lever 162. A shift from the low speed ratio to the second speed ratio can be accomplished in this fashion.

Similarly when the lever 150 is rotated in a clockwise direction to the extreme position, the finger 147 is engageable with the collar associated with shift rail 148. A subsequent rotation of shift lever 162 will then cause a shifting movement of the synchronizer clutch sleeve 86 in either a forward or aft direction to accomplish a shift to the third speed ratio or to a direct drive ratio depending upon the direction of rotation of lever 162.

Figure 5:
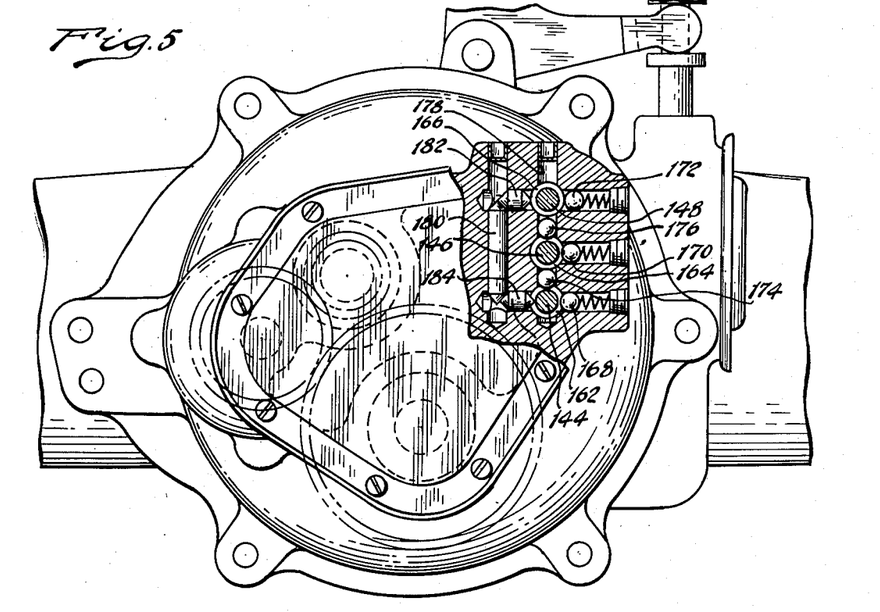
FIGURE 5 is a partial transverse cross sectional view showing the interlock mechanism for the shifter rails and is taken along section line 5—5 of FIGURE 4.

During a shift from one speed ratio to another in the manner above described, it is essential during a shifting movement of one of the shift rails that the other two shift rails assume a neutral position. If any two of the synchronized gears were to be simultaneously engaged, the transmission mechanism would assume a locked-up condition and it would be inoperative. We have therefore provided an interlock mechanism, as best seen in FIGURE 5, that prevents one of the synchronizer clutches from operating while the other is engaged. This interlock mechanism comprises detent grooves having tapered sides, the grooves for rails 144, 146, and 148 being identified respectively by reference characters 162, 164, and 166. A spring loaded ball is engageable with each of these grooves, and these balls are respectively identified by reference characters 168, 170, and 172. When any one of the shift rails assumes a neutral position, the respective ball detent is engageable with its detent groove.

A ball element 174 is situated between shift rails 144 and 146, and another ball element 176 is situated between shift rails 146 and 148. The diameter of the ball 174 is such that it is capable of inhibiting movement of one shift rail when the other shift rail is out of the neutral position. When the shift rail is in the neutral position, the ball 174 engages the associated detent groove. The balls 174 and 176 are situated slidably within a bore 178 in the portion of the housing within which the shift rails are located.

It is apparent from the foregoing that the shift rail 146 cannot be actuated when the shift rail 144 is out of its neutral position. The converse also is true. In a similar fashion shift rail 146 cannot be moved when the shift rail 148 is out of its neutral position. The converse of this also is true.

In order to inhibit movement of shift rail 148 when the shift rail 144 is out of its neutral position, or conversely, to inhibit movement of shift rail 144 when shift rail 148 is out of its neutral position, we have provided blocker elements 180, 182, and 184. Each of these elements is in the form of a cylinder with tapered ends. The elements 182 and 184 are adapted to reciprocate in cooperating openings in a direction transverse to the direction of the axes of the shift rails. The lines of movement of the elements 182 and 184, however, are parallel to each other.

Element 180 is adapted to oscillate in a direction transverse to the lines of movement of elements 182 and 184. Element 180 is also formed with tapered ends, one end being engageable with a corresponding end of the element 184, and the other end of the element 180 being engageable with the corresponding end of element 182.

As shown in FIGURE 5, element 184 is engagable with the groove 162 and the shift rail 166 is out of the neutral position. This being the case, element 182 is shifted in a left hand direction as viewed in FIGURE 5 thereby causing movement of element 180 in a downward direction as viewed in FIGURE 5. This in turn causes shifting movement of element 184 in a right hand direction as viewed in FIGURE 5. It is therefore impossible for shift rail 144 to be actuated under these conditions.

Conversely if the shift rail 144 is moved fom the neutral position shown, and if the shift rail 148 is in its neutral position, element 184 will be urged in a left hand direction thereby causing a shifting movement of the element 182 in a right hand direction into engagement with the annular groove 166. A shifting movement of the shift rail 148 from its neutral position will thereby be inhibited.

Having thus described the principal features of preferred embodiments of our invention, what we claim and desire to secure by U.S. Letters Patent is:

1. A power transmission mechanism comprising a power input shaft, a power output sleeve shaft concentrically disposed about said power input shaft, a power output pinion connected to said power output shaft, and gear elements drivably connecting said power input and power output shafts, the gear elements being adapted to establish plural torque delivery paths between said power input shaft and said power output shaft with varying speed ratios, a first group of said gear elements being mounted for rotation about the axis of said power input and power output shafts, a second group of said gear elements being mounted for rotation about an axis parallel to the axis of said first group, separate gear elements of one group being in continuous meshing engagement with each companion gear elements of the other group during torque delivery from said power input shaft to said power output shaft in a forward driving direction, and separate synchronizer clutch means for said first and second groups for controlling the relative motion of said gear elements and for selectively establishing said torque delivery paths through said gear elements, each synchronizer clutch means being adapted to connect selectively each of said separate gear elements to its associated shaft.

2. A right angle drive power transmission mechanism comprising a power input shaft, a power output sleeve shaft concentrically disposed about said power input shaft, a bevel pinion connected to said power output shaft, the latter being adapted to engage a bevel ring gear with an axis transverse to the axis of said bevel pinion, and gear elements drivably connecting said power input and power output shafts, said gear elements being adapted to establish plural torque delivery paths between said power input and power output shafts with varying speed ratios, a first group of said gear elements being mounted for rotation about the axis of said power input and power output shafts, a second group of said gear elements being mounted for rotation about an axis parallel to the axis of said first group, each gear element of said first group being in continuous meshing engagement with a separate one of the gear elements of said second group during torque delivery from said power input shaft to said power output shaft in a forward driving direction, and separate synchronizer clutch means for said first and second groups for controlling the relative motion of said gear elements and for selectively establishing said torque delivery paths through said gear elements, each of said synchronizer clutch means being adapted to connect selectively the gear elements of the respective groups to its associated shaft.

3. A power transmission mechanism comprising a power input shaft, a power output sleeve shaft concentrically disposed about said power input shaft, a power output pinion connected to said power output shaft, gear elements drivably connecting said power input and power output shafts, the gear elements being adapted to establish plural torque delivery paths between said power input shaft and said power output shaft with varying speed ratios, a first group of said gear elements being mounted for rotation about the axis of said power input and power output shafts, a second group of said gear elements being mounted for rotation about an axis parallel to the axis of said first group, separate synchronizer clutch means for said first and second groups for controlling the relative motion of said gear elements and for selectively establishing said torque delivery paths through said gear elements, and a reverse idler mounted for rotation about an axis spaced from the axis of said first and second groups of gear elements, said reverse idler being in continuous meshing engagement with one gear element of said first group, one gear element of said second group being axially movable into meshing engagement with said idler gear to establish a reverse torque delivery path between said power input shaft and said power output shaft.

4. A right angle drive power transmission mechanism comprising a power input shaft, a power output sleeve shaft concentrically disposed about said power input shaft, a bevel pinion connected to said power output shaft, the latter being adapted to engage a bevel ring gear with an axis transverse to the axis of said bevel pinion, gear elements drivably connecting said power input and power output shafts, said gear elements being adapted to establish plural torque delivery paths between said power input and power output shafts with varying speed ratios, a first group of said gear elements being mounted for rotation about the axis of said power input and power output shafts, a second group of said gear elements being mounted for rotation about an axis parallel to the axis of said first group, separate synchronizer clutch means for said first and second groups for controlling the relative motion of said gear elements and for selectively establishing said torque delivery paths through said gear elements, and a reverse idler mounted for rotation about an axis spaced from the axis of said first and second groups of gear elements, said reverse idler being in continuous meshing engagement with one gear element of said first group, one gear element of said second group being axially movable into meshing engagement with said idler gear to establish a reverse torque delivery path between said power input shaft and said power output shaft.

5. A power transmission mechanism comprising a power input shaft, a power output sleeve shaft concentrically disposed about said power input shaft, gear elements drivably connecting said power input and power output shafts, the gear elements being adapted to establish plural torque delivery paths between said power input shaft and said power output shaft with varying speed ratios, a first group of said gear elements being mounted for rotation about the axis of said power input and power output shafts, a second group of said gear elements being mounted for rotation about an axis parallel to the axis of said first group, separate synchronizer clutch means for said first and second groups for controlling the relative motion of said gear elements and for selectively establishing said torque delivery paths through said gear elements, and a reverse idler mounted for rotation about an axis spaced from the axis of said first and second groups of gear elements, said reverse idler being in continuous meshing engagement with one gear element of said first group, one gear element of said second group being axially movable into meshing engagement with said idler gear to establish a reverse torque delivery path between said power input shaft and said power output shaft, said one gear element of said second group of gear elements being engageable with the synchronizer clutch means for said second group of gear elements to form a low speed torque delivery path during forward drive operation when it assumes one axial position and forming a portion of a reverse torque delivery path when it assumes another axial position.

6. A power transmission mechanism comprising a power input shaft, a power output sleeve shaft concentrically disposed about said power input shaft, a power output pinion connected to said power output shaft, gear elements drivably connecting said power input and power output shafts, said gear elements being adapted to establish plural torque delivery paths between said power input shaft and said power output shaft with speed ratios of varying magnitude, a first group of said gear elements being mounted for rotation about the axis of said power input and power output shafts, a second group of said gear elements being mounted for rotation about an axis parallel to the axis of said first group, a reverse idler gear mounted for rotation about an axis parallel to and spaced from the axes of said groups of gear elements, a gear element of one of said groups being in continuous meshing engagement with said reverse idler, one gear element of the other of said groups being movable in an axial direction into engagement with said reverse idler to establish a reverse torque delivery path between said power input and power output shafts, said one gear element of said other group forming a portion of a forward torque delivery path when it assumes another axial poistion, and separate synchronizer clutch means for said first and second groups for controlling the relative motion of said gear elements and for selectively establishing forward driving torque delivery paths through said gear elements.

7. A power transmission mechanism comprising a power input shaft, a power output sleeve shaft concentrically disposed about said power input shaft, a power output pinion connected to said power output shaft, gear elements drivably connecting said power input and power output shafts, said gear elements being adapted to establish plural forward driving torque delivery paths between said power input and power output shafts with speed ratios of varying magnitude, a first group of said gear elements being mounted for rotation about the axis of said power input and power output shafts, a second group of said gear elements being mounted for rotation about an axis parallel to the axis of said first group, a reverse idler gear mounted for rotation about an axis parallel to and spaced from the axes of said first and second groups of gear elements, said second group of gear elements including a reverse driving gear in continuous meshing engagement with said reverse idler, one gear element of said first group being axially movable into meshing engagement with said reverse idler to establish a reverse drive torque delivery path and movable to another axial position to establish a forward driving torque delivery path, and separate synchronizer clutch means for said first and second groups for controlling the relative motion of said gear elements and for selectively establishing said forward driving torque delivery paths through said gear elements.

8. A power transmission mechanism comprising a power input shaft, a power output shaft coaxially disposed relative to said power input shaft, a mainshaft, a countershaft mounted for rotation about an axis parallel to the axis of said power input shaft, a first group of gear elements mounted for rotation about the axis of said mainshaft, one gear element of said first group being connected to said power input shaft, a second group of gear elements mounted for rotation about the axis of said countershaft, each gear element of said first group being in continuous meshing engagement with a separate one of the gear elements of said second group during torque delivery from said power input shaft to said power output shaft in a forward driving direction, and a double acting synchronizer clutch means associated with each group of gear elements for selectively clutching the gear elements of said first group to said mainshaft and the gear elements of said second group to said countershaft respectively, one of said gear elements of said first group being connected to said power output shaft.

9. A power transmission mechanism comprising a power input shaft, a power output sleeve shaft concentrically disposed about said power input shaft, a mainshaft, a countershaft mounted for rotation about an axis parallel to the axis of said power input shaft, a first group of gear elements mounted for rotation about the axis of said mainshaft, one gear element of said first group being connected to said power input shaft, a second group of gear elements mounted for rotation about the axis of said countershaft, each gear element of said first group being in continuous meshing engagement with a separate one of the gear elements of said second group during torque delivery from said power input shaft to said power output shaft in a forward driving direction, a double acting synchronizer clutch means associated with each group of gear elements for selectively clutching the gears of said first group to said mainshaft and the gears of said second group to said countershaft respectively, a reverse gear connected to said countershaft, and a reverse idler mounted for rotation about an axis parallel to and spaced from the axes of said first and second groups of gear elements, one gear of said first group being axially slidable into meshing engagement with said reverse idler and being axially movable in the opposite direction into meshing engagement with one gear element of said second group of gear elements to establish a low speed torque delivery path between said power input and power output shafts.

10. A power transmission mechanism comprising a power input shaft, a power output sleeve shaft concentrically disposed about said power input shaft, a mainshaft, a countershaft mounted for rotation about an axis parallel to the axis of said power input shaft, a first group of gear elements mounted for rotation about the axis of said mainshaft, one gear element of said first group being connected to said power input shaft, a second group of gear elements mounted for rotation about the axis of said countershaft, each gear element of said first group being in continuous meshing engagement with a separate one of the gear elements of said second group during torque delivery from said power input shaft to said power output shaft in a forward driving direction, a double acting synchronizer clutch means associated with each group of gear elements for selectively clutching the gear elements of said first group to said mainshaft and the gear elements of said second group to said countershaft respectively, and a reverse idler mounted for rotation about an axis parallel to and spaced from the axis of said power input and power output shafts, said first group including a reverse gear element in continuous meshing engagement with said reverse idler, one gear element of said second group being movable between two axial positions, said one gear element being engageable with said reverse idler when it assumes one axial position and being engageable with one gear element of said first group to establish a forward driving torque delivery path when it assumes another axial position.

11. A power transmission mechanism comprising a power input shaft, a power output shaft coaxially disposed relative to said power input shaft, gear elements drivably connecting said power input and power output shafts, said gear elements being adapted to establish plural driving torque delivery paths between said power input and power output shafts with speed ratios of varying magnitude, the first group of said gear elements being mounted for rotation about the axis of said power input and power output shafts, a second group of said gear elements being mounted for rotation about an axis parallel to the axis of said first group, a reverse idler gear mounted for rotation about an axis parallel to and spaced from the axes of said first and second groups of gear elements, said second group of gear elements including a reverse driving gear in continuous meshing engagement with said reverse idler, one gear element of said first group being axially movable into meshing engagement with said reverse idler to establish a reverse drive torque delivery path and movable to another axial position to establish a forward driving torque delivery path, and separate synchronizer clutch means for said first and second groups for controlling the relative motion of said gear elements and for selectively establishing said forward driving torque delivery paths through said gear elements.

12. A power transmission mechanism comprising a power input shaft, a power output shaft coaxially disposed with respect to said power input shaft, a mainshaft connected to said power input shaft, a countershaft mounted for rotation about an axis parallel to the axis of said power input shaft, a first group of gear elements mounted for rotation about the axis of said mainshaft, a second group of gear elements mounted for rotation about the axis of said countershaft, each gear element of said first group being in continuous meshing engagement with a separate one of the gear elements of said second group during torque delivery from said power input shaft to said power output shaft in a forward driving direction, a double acting sychronizer clutch means associated with each group of gear elements for selectively clutching the gears of said first group to said mainshaft and the gears of said second group to said countershaft respectively, a reverse gear connected to said countershaft, and a reverse idler mounted for rotation about an axis parallel to and spaced from the axes of said first and second groups of gear elements, one gear element of said first group being axially slidable into meshing engagement with said reverse idler and being movable axially in the opposite direction into meshing engagement with one gear element of said second group of gear elements to establish a low speed torque delivery path between said power input and power output shafts.

13. A power transmission mechanism comprising a power input shaft, a power output shaft, gear elements forming plural torque delivery paths between said shafts, clutch means for controlling the relative motion of said gear elements to condition said mechanism for operation in any one of several speed ratios, three parallel shift rails, clutch actuator means carried by each shift rail and forming a part of said clutch means whereby said clutch means are applied and disengaged upon movement of said shift rails from a neutral position, an interlock element situated between two adjacent shift rails, a second detent element situated between another pair of said shift rails, a first interlock recess adjacent one of a pair of relatively remotely positioned shift rails and extending transversely therefrom, a third interlock element disposed slidably in said first recess, a second interlocking recess adjacent the other of said pair of remotely positioned shift rails and extending transversely therefrom, a fourth interlock element disposed in said second recess, a third interlock recess extending between and communicating with said first and second recesses, and a fifth interlock element in said third recess cooperating with said third and fourth interlock elements and adapted to transfer the motion from said third interlock element to said fourth interlock element and from said fourth interlock element to said third interlock element, the interlock elements cooperating with each shift rail being actuated upon movement of the latter from a neutral position whereby two of said shift rails are held in a fixed position whenever one of said shift rails is actuated from its neutral position.

References Cited in the file of this patent

UNITED STATES PATENTS

| | | |
|---|---|---|
| 2,038,326 | Wagner | Apr. 21, 1936 |
| 2,249,035 | Peterson et al. | July 15, 1941 |
| 2,637,221 | Backus et al. | May 5, 1953 |
| 2,644,340 | Youngren et al. | July 7, 1953 |
| 2,953,035 | Herr | Sept. 20, 1960 |

UNITED STATES PATENT OFFICE
CERTIFICATE OF CORRECTION

Patent No. 3,115,047 December 24, 1963

Royston C. Lunn et al.

It is hereby certified that error appears in the above numbered patent requiring correction and that the said Letters Patent should read as corrected below.

Column 11, line 38, for "the" read -- a --; lines 45 and 46, for "said second" read -- said first --; line 48, for "first" read -- second --; column 12, line 16, for "first" read -- second --; line 19, for "second" read -- first --.

Signed and sealed this 14th day of July 1964.

(SEAL)

Attest:

ESTON G. JOHNSON
Attesting Officer

EDWARD J. BRENNER
Commissioner of Patents